Sept. 7, 1954 D. T. KADUSHIN ET AL 2,688,723
MAGNETIC AMPLIFIER SYSTEM
Filed Sept. 16, 1949
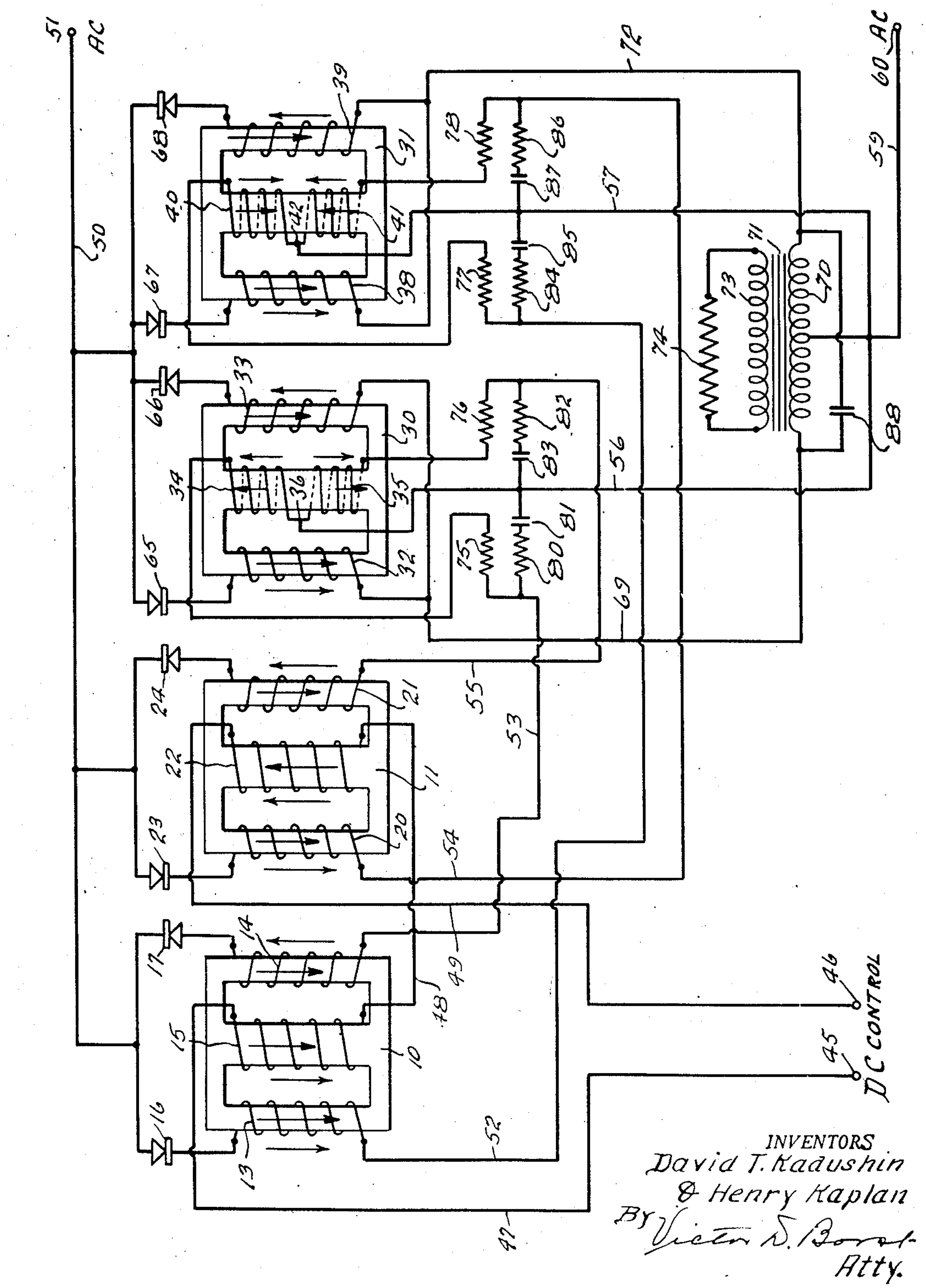
INVENTORS
David T. Kadushin
& Henry Kaplan
By Victor D. Borst
Atty.

Patented Sept. 7, 1954 2,688,723

UNITED STATES PATENT OFFICE 2,688,723

MAGNETIC AMPLIFIER SYSTEM

David T. Kadushin, Brooklyn, and Henry Kaplan, New York, N. Y., assignors to The Sperry Corporation, a corporation of Delaware Application September 16, 1949, Serial No. 116,164

3 Claims. (Cl. 323—89)

This invention relates to magnetic amplifiers and has for an object to provide a magnetic amplifier circuit of high sensitivity and dependability.

Various other objects and advantages will be apparent as the nature of the invention is more fully disclosed.

In accordance with the present invention the magnetic amplifier comprises two stages each of which includes a pair of saturable core reactors connected in push-pull relationship. Each of the reactors may be of the general type disclosed in the Logan Patent No. 2,126,790, dated August 16, 1938, which shows a magnetic core structure having two outer legs carrying load windings and a central leg carrying a control winding. The windings on the outer legs are connected through oppositely poled rectifiers to the load circuit so that each winding carries a unidirectional current. In a device of this type a sensitive control of the load current is effected by varying the current applied to the control winding on the center leg.

In accordance with the present system, the control windings of the two reactors of each stage are so connected that the saturation of one core is decreased and the saturation of the other core is correspondingly increased in response to a change in control current.

The load windings of the first stage ar connected in opposition to control windings of saturable core reactors of the second stage so that the control of the second stage is effected by the unbalance between the load currents in the two reactors of the first stage. The load windings of the second stage are connected in push-pull relationship to an output load in such manner that the output load is dependent upon the unbalance between the currents flowing in the respective load windings of the reactors of the second stage. In this way variations due to fluctuations in line voltage are eliminated from the output load and fluctuations in output load are made dependent upon and sensitive to variations in the control current to the first stage. By suitable tuning of the output the sensitivity of the load circuit to changes in the input control current may be greatly increased.

This system is applicable, for example, to servo units where a comparatively large output is to be controlled by an extremely small control current. The system also provides for a control of the phase of the output current in response to variations in the control current in opposite direction from a predetermined value. Such phase control is suitable, for example, to control a reversible servo motor.

The nature of the invention will be better understood by referring to the following description, taken in connection with the accompanying drawing in which a specific embodiment thereof has been set forth for purposes of illustration.

In the drawing the figure is a schematic diagram illustrating a two-stage push-pull magnetic amplifier embodying the present invention.

Referring to the drawing, the first stage comprises a pair of saturable core reactors 10 and 11. The reactor 10 is provided with a pair of load windings 13 and 14 and a control winding 15 which are wound, respectively, on the outer and central legs of a closed core of the type disclosed in the Logan patent above referred to. The load windings 13 and 14 are connected, respectively, to oppositely poled rectifiers 16 and 17.

The saturable core reactor 11 is provided with a pair of load windings 20 and 21 and a control winding 22. The load windings 20 and 21 are connected to oppositely poled rectifiers 23 and 24, respectively.

The second amplifier stage comprises a pair of saturable core reactors 30 and 31. The reactor 30 is provided with a pair of load windings 32 and 33 and with a split control winding comprising sections 34 and 35 which are connected in series and provided with a central tap 36. The reactor 31 comprises load windings 38 and 39 and split control winding comprising sections 40 and 41 which are connected in series and are provided with a central tap 42.

D. C. control current is applied to terminals 45 and 46. The terminal 45 is connected by a lead 47 to the control winding 15 of the saturable core reactor 10, thence by a lead 48 to the control winding 22 of the saturable core reactor 11 and thence by a lead 49 to the terminal 46. The connections are such that the two control windings 15 and 22 are connected in series but exert their controls in opposite sense, that is, an increase in current through the control winding 15 increases the saturation of the saturable core reactor 10 and an increase in current through the control winding 22 decreases the saturation of the saturable core reactor 11 or vice versa.

The rectifiers 16, 17, 23 and 24 are connected in parallel to a line 50 which leads to an alternating current supply terminal 51. The sides of the load windings 13 and 14 opposite the rectifiers 16 and 17 are connected by leads 52 and 53, respectively, to control windings 40 and 34, respectively. The load windings 20 and 21 are connected by leads 54 and 55 to control windings 41 and 35, respectively. The center taps 36 and 42 of the control windings of the saturable core reactors 30 and 31 are connected by leads 56 and 57, respectively, to a line 59 leading to a terminal 60 which is connected to the other side of the alternating current supply.

In the second stage the load windings 32 and 33 are connected, respectively, through oppositely poled rectifiers 65 and 66 to the line 50 and load windings 38 and 39 are connected, respectively, through oppositely poled rectifiers 67 and 68 to the line 50. The opposite ends of the windings 32 and 33 are connected by a lead 69 to one side of the primary 70 of a push-pull output transformer 71. The other sides of the windings 38 and 39 are connected by a lead 72 to the second side of the primary 70 of the push-pull output transformer 71. The secondary 73 of the transformer 71 is connected to a load 74 which may, for example, constitute a reversible motor or other device which is to be controlled.

The arrows associated with the several reactors in the drawing indicate by way of example directions of current and flux, those outside the legs of the cores indicating current direction and those on the legs indicating flux direction. The windings on the outer legs of each core are in all cases in directions to establish a flux in a common direction through the middle leg, while the D. C. winding on the middle leg of reactor 10 is, with the current polarity as indicated, in a direction to establish a flux opposed to that resulting from the current through the windings on the outer legs, and the D. C. winding on the middle leg of reactor 11 is in a direction to establish a flux augmenting that resulting from the current through the windings on the outer legs.

The two halves of each of the split control windings on the middle legs of the cores of reactors 30 and 31 are wound in the same direction and the control windings are wound alike on the two legs. The current passes through these control windings on alternate half cycles and hence in relatively opposite directions. Since windings 34 and 40 are in the same direction and opposed electrically to that of windings 35 and 41, respectively, the flux established by windings 34 and 40 is in opposite directions to each other and the flux established by windings 35 and 41 is in opposite directions to each other and opposed, respectively, to the flux established by windings 34 and 40. This is indicated by the arrows on these middle legs.

In order to improve the operation of the system resistors 75, 76, 77 and 78 may be connected in series with windings 34, 35, 40 and 41, respectively. The resistor 75 and windings 34 are by-passed by a resistor 80 and condenser 81 connected in series. The resistor 76 and winding 35 are by-passed by resistor 82 and condenser 83 connected in series. The resistor 77 and winding 40 are by-passed by a resistor 84 and condenser 85 connected in series. The resistor 78 and winding 41 are by-passed by resistor 86 and condenser 87 connected in series. The primary 70 of the push-pull output transformer is tuned by a condenser 88.

In the operation of this device a variation in the control current through the various control windings operates to change the state of saturation of the various saturable core reactors in the manner pointed out more in detail in the Logan patent above referred to. In this embodiment the two reactors 10 and 11 are so connected that an alteration in the control current applied from the terminals 45 and 46 through the control windings 15 and 22 serves to increase the saturation of one of the reactors and to decrease the saturation of the other reactor, thereby increasing the load current through the load windings of one reactor and decreasing the load current through the load windings of the other reactor. If, for example, the load current through the winding 13 is increased and that through the winding 20 is decreased then more current will flow through the section 40 of the control winding of the saturable core reactor 31 than through the section 41 of said control winding, producing an unbalance which alters the state of saturation of the saturable core reactor 31 in a predetermined sense. At the same time the unbalance produced in the currents flowing through the control windings 34 and 35, due to variations in current in the load windings 14 and 21, produces a change in the opposite sense in the state of saturation of the saturable core reactor 30. This increase in the state of saturation in the reactor 30 and decrease in the state of saturation of the reactor 31, or vice versa, produces a corresponding unbalance in the load current flowing through the two halves of the primary 70 of the output transformer 71 and induces a voltage in the secondary 73 of a value which is proportional to the state of unbalance and having a phase relationship which is dependent upon the direction of the state of unbalance.

The condensers 81, 83, 85 and 87 serve to smooth out the operation of the device so that the control exercised by the control windings of each of the units 30 and 31 may be made to extend over a full cycle and thus remain substantially continuous. These condensers also serve to tune and thereby increase the sensitivity of the circuits. The primary 70 or the secondary 73 of the output transformer 71 may be tuned by the condenser 88, shown across the primary 70, in such a manner as to greatly increase the sensitivity of the system. It will be noted that when the units 10, 11, 30 and 31 have the same state of saturation the system is in balance and no voltage is produced in the secondary 73 of the output transformer 71. Likewise, variations in conditions of the A. C. line connected to the terminals 51 and 60 affect both units of each stage equally and thereby do not affect the balance in the output circuit. Hence the effect of such fluctuations is cancelled out and the response is made sensitive only to variations in the D. C. control applied to the terminals 45 and 46.

What is claimed is:

1. A magnetic amplifier having two stages each comprising a pair of saturable core reactors, each reactor having a pair of load windings, a series control winding on each of the first stage reactors, a split control winding having a center tap on each of the second stage reactors, a source of direct current, means connecting the control windings of the first stage reactors across said source in series, the current through the said first stage control windings tending to affect the saturation of the respective reactors in opposite sense, a source of alternating current, means including oppositely poled half wave rectifiers connecting the respective load windings of each reactor to one side of the alternating current source, means connecting the center taps of the said split control windings to the other side of the alternating current source, means connecting the output side of the two load windings of the first stage reactors poled in one direction to respectively opposite sides of the split control winding of one of the second stage reactors, means connecting the output side of the two load windings of the first stage reactors poled in the opposite direction to respectively opposite sides of the split control winding of the other reactor of the second stage, a translating device conductively connected to the other side of the alternating current source, and means connecting the load windings of each of the reactors of the second stage in parallel and in push-pull relationship to the translating device.

2. In a magnetic amplifier as set forth in claim 1, filtering means connected across the output leads of each pair of similarly poled load windings of the first stage reactors to smooth out the pulsations in the applied currents.

3. In a magnetic amplifier as set forth in claim 2, filtering means connected across said split windings to smooth out the pulsations in the applied currents.

References Cited in the file of this patent

UNITED STATES PATENTS

| Number | Name | Date |
|---|---|---|
| 2,057,463 | West | Oct. 13, 1936 |
| 2,126,790 | Logan | Aug. 16, 1938 |
| 2,338,423 | Geyger | Jan. 4, 1944 |
| 2,414,936 | Edwards et al. | Jan. 28, 1947 |
| 2,453,470 | Steinitz | Nov. 9, 1948 |

OTHER REFERENCES

Publication, "Grundlagen der magnetischen Verstarker für die Meb-und Regeltechnik," by Wilhelm Geyger, published April 20, 1940.